(12) United States Patent
Ho et al.

(10) Patent No.: US 7,630,403 B2
(45) Date of Patent: Dec. 8, 2009

(54) MAC AGGREGATION FRAME WITH MSDU AND FRAGMENT OF MSDU

(75) Inventors: Jin-Meng Ho, Plano, TX (US); Don Shaver, Dallas, TX (US); Xiaolin Lu, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1434 days.

(21) Appl. No.: 10/188,188

(22) Filed: Jul. 2, 2002

(65) Prior Publication Data

US 2003/0169769 A1 Sep. 11, 2003

Related U.S. Application Data

(60) Provisional application No. 60/363,030, filed on Mar. 8, 2002.

(51) Int. Cl.
*H04J 3/24* (2006.01)
*H04L 12/56* (2006.01)

(52) U.S. Cl. .......................... 370/473; 370/389

(58) Field of Classification Search ............ 370/276, 370/277, 280, 310, 314, 328, 351, 395.4, 370/471, 389, 473, 474; 709/236
See application file for complete search history.

(56) References Cited

U.S. PATENT DOCUMENTS

| | | | | |
|---|---|---|---|---|
| 6,031,844 A | * | 2/2000 | Lin | 370/431 |
| 6,151,324 A | * | 11/2000 | Belser et al. | 370/397 |
| 6,693,888 B2 | * | 2/2004 | Cafarelli et al. | 370/338 |
| 6,694,100 B1 | * | 2/2004 | Fatehi et al. | 398/99 |
| 6,704,794 B1 | * | 3/2004 | Kejriwal et al. | 709/236 |
| 6,721,334 B1 | * | 4/2004 | Ketcham | 370/473 |
| 6,747,976 B1 | * | 6/2004 | Bensaou et al. | 370/395.4 |
| 6,760,877 B1 | * | 7/2004 | Lappetelainen et al. | 714/748 |
| 7,002,993 B1 | * | 2/2006 | Mohaban et al. | 370/471 |
| 7,006,464 B1 | * | 2/2006 | Gopalakrishnan et al. | 370/328 |
| 7,050,459 B2 | * | 5/2006 | Kandala | 370/469 |
| 7,110,380 B2 | * | 9/2006 | Shvodian | 370/336 |
| 7,251,685 B1 | * | 7/2007 | Yildiz | 709/221 |
| 2003/0003905 A1 | * | 1/2003 | Shvodian | 455/423 |

FOREIGN PATENT DOCUMENTS

US    EP 1104141 A2 * 11/2000

* cited by examiner

*Primary Examiner*—Hong Cho
*Assistant Examiner*—Saba Tsegaye
(74) *Attorney, Agent, or Firm*—Lawrence J. Bassuk; W. James Brady; Frederick J. Telecky, Jr.

(57) ABSTRACT

Apparatus and methods implement aggregation frames and allocation frames. The aggregation frames include a plurality of MSDUs or fragments thereof aggregated or otherwise combined together. An aggregation frame makes more efficient use of the wireless communication resources. The allocation frame defines a plurality of time intervals. The allocation frame specifies a pair of stations that are permitted to communicate with each other during each time interval as well as the antenna configuration to be used for the communication. This permits stations to know ahead of time when they are to communicate, with which other stations and the antenna configuration that should be used. A buffered traffic field can also be added to the frames to specify how much data remains to be transmitted following the current frame. This enables network traffic to be scheduled more effectively.

14 Claims, 4 Drawing Sheets

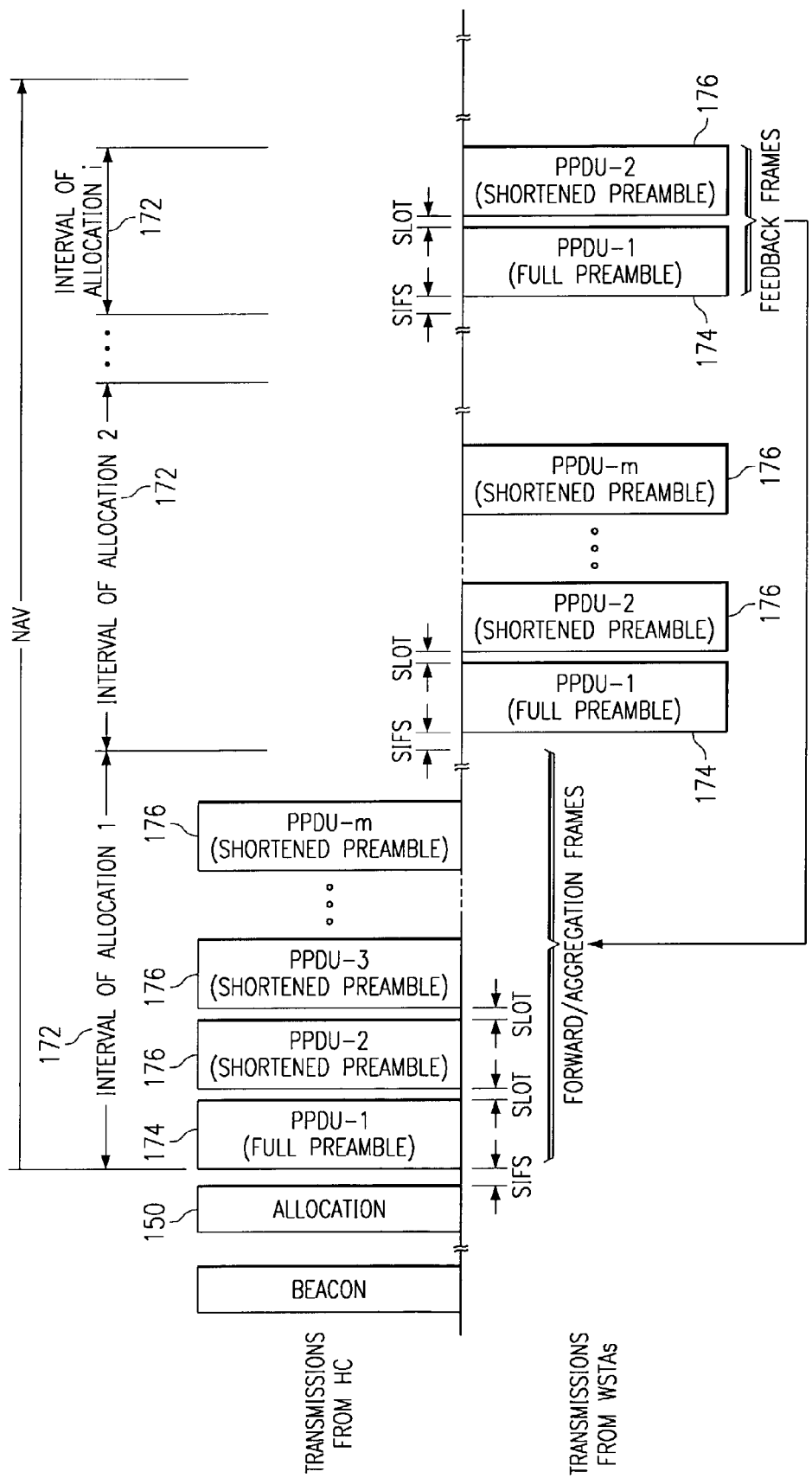

ns of the prior art, therefore, is highly desirable.

MAC AGGREGATION FRAME WITH MSDU AND FRAGMENT OF MSDU

CROSS-REFERENCE TO RELATED APPLICATIONS

This application is a non-provisional application claiming priority to provisional application Ser. No. 60/363,030, filed on Mar. 8, 2002, entitled "MAC Extensions For Smart Antenna Support," the teachings of which are incorporated by reference herein.

STATEMENT REGARDING FEDERALLY SPONSORED RESEARCH OR DEVELOPMENT

Not applicable.

BACKGROUND OF THE INVENTION

1. Field of the Invention

The present invention generally relates to wireless communications. More particularly, the invention relates to medium access control (MAC) frames and mechanisms enabling smart antenna use, improving channel utilization, and increasing communications throughput.

2. Background Information

Initially, computers were most typically used in a standalone manner. It is now commonplace for computers and other types of electronic devices to communicate with each other over networks. The ability for computers to communicate with one another has lead to the creation of small networks comprising two or three computers to vast networks comprising hundreds or even thousands of computers. Networks can be set up to provide a wide assortment of capabilities. For example, networked computers can be established to permit each computer to share a centralized mass storage device or printer. Further, networks enable electronic mail and numerous other types of services. Networks have been established in a wired configuration in which each entity on the network has a direct physical electrical connection to the network. More recently, advances in wireless technology has made it possible for network devices to communicate with others via radio frequency (RF) or other types of wireless media.

To implement a wireless network, each device (computer, access point, etc.) includes one or more antennas through which data is transmitted or received. One type of antenna configuration is referred to as single input, single output (SISO) and is depicted conceptually in FIG. 1. Two network stations 10 and 12 are shown in communication with each other. The stations could be computers, access points, and the like. In a SISO configuration, each station 10 and 12 includes a single antenna 14 and 16, respectively. Data is communicated between the stations 10, 12 in an exchange sequence via the single wireless link 18.

An exemplary exchange sequence is illustrated in FIG. 2. One of the stations 10, 12 sends a data frame 20 to the other station which responds with an acknowledgment frame 22. The data frame may include a preamble 24, a header 26 and a data payload 28. Similarly, the acknowledgment frame 22 includes a preamble 30, a header 32 and a data payload 34. The data frame conveys data to the receiving station and the acknowledgment frame lets the sending station know that the data frame was correctly received. If the data frame was not correctly received (e.g., due to noise or interference), the sending station may resend the data frame.

The total elapsed time required for the data frame 20 and subsequent acknowledgment frame 22 to be transmitted in a SISO antenna configuration is shown in FIG. 2 as time $T_{SISO}$. To a certain extent, the information contained in data frame 20 may be transmitted in less time using a multiple input, multiple output (MIMO) configuration such as that shown in FIG. 3. As shown, stations 10, 12 each includes a pair of antennas that communicate with the pair antennas on the other station. Thus, for example, antenna 40 can communicate with antenna 44 and antenna 42 can communicate with antenna 46, thereby establishing two simultaneously available communication links 48 and 50 between stations 10 and 12. This type of MIMO configuration is referred to as a "2×2" MIMO configuration, and other types of MIMO configurations exist in which more than two antennas at each station are implemented such as "3×3" MIMO, etc.

The advantage of a MIMO antenna configuration is illustrated with regard to FIGS. 4a-4c. FIG. 4a simply repeats the SISO frame exchange sequence from FIG. 2. As noted above, the time required to transfer the data and acknowledgment frames is $T_{SISO}$. FIGS. 4b and 4c depict the frame exchange sequence using the 2×2 MIMO antenna configuration of FIG. 3. With MIMO, the bit stream can be broken into two parts and the parts can then be transmitted simultaneously via the two communication links 48 and 50. Thus, the overall time required to transfer the same information is advantageously reduced. In FIG. 4c, the total time is shown as $T_{MIMO}$, which is less than $T_{SISO}$. The time savings largely comes from being able to divide the data payload 28 of the data frame 24 into two smaller fields 52 and 54. Various techniques are known for doing this such as putting all of the even bits of data field 28 into field 52 and the odd bits into field 54. At the receiving station, the data parts 52 and 54 then can be reassembled into a single data payload.

Although the data field 28 advantageously can be broken apart for concurrent transmission, not all of the fields in the frames can be broken apart. Specifically, the preamble and header fields 24 and 26 must be maintained in their entirety. This is so because those fields contain information that is necessary for the proper reception of the data from the network. Also, the acknowledgment frame, being relatively small, is not broken apart. Thus, although 2×2 MIMO provides two independent and simultaneous communication links, communication throughput speed is not doubled.

The preceding discussion illustrates two problems for which solutions are highly desirable. One problem concerns how to take advantage of the increased communication speed provided by a MIMO antenna configuration. As noted above, a 2×2 MIMO configuration makes it possible to transmit twice as many bits in the same amount of time as in a SISO configuration. However, the overhead information, much of which cannot be broken apart, contained in typical wireless communication frames reduces the throughput gains that otherwise would be possible.

Another problem is that it is desirable to provide wireless networks that can be configured as flexibly as possible. For example, it might be desired for some stations to be SISO only while other stations are capable of MIMO communications. Further still, of the MIMO stations, it might be desirable for some stations to be configured as 2×2 MIMO, while other MIMO stations are 3×3 MIMO. It might also be desirable for some stations to reconfigure themselves for different types of MIMO or SISO configurations during operation as they communicate with other stations on the network. In general, MIMO stations may not know in advance which antenna configuration should be used to receive an incoming frame from the air.

Moreover, any improvement to the efficiency of wireless communications is desirable. A system that solves the problems described above and, in other respects, generally improves the efficiency of wireless channel utilization would be highly desirable.

BRIEF SUMMARY OF THE PREFERRED EMBODIMENTS OF THE INVENTION

The preferred embodiments of the present invention solve the problems noted above by providing apparatus and methods for implementing various new types of communication frames and mechanisms. Such new frame types include forward frames, aggregation frames, feedback frames, and allocation frames. In general, the forward frame represents a shortened version of conventional data frames. Specifically, the header information has been encoded differently to require fewer bits. The aggregation frames include a plurality of MAC service data units (MSDUs) or fragments thereof aggregated together. An aggregation frame makes more efficient use of the wireless communication resources by combining together data units that otherwise would have been transmitted in separate data frames, each frame including its own overhead information. The feedback frame provides acknowledgment to a group of transmitted frames each of which would otherwise require a separate acknowledgement frame. The feedback frame also contains the channel state information that may be explored by the transmitting station in coding the MIMO bit streams to reduce reception errors. The allocation frame defines a plurality of time intervals. The allocation frame specifies a pair of stations that are permitted to communicate with each other during each time interval as well as the antenna configuration to be used for the communication. The allocation frame is broadcast to network stations using the conventional SISO antenna configuration. This frame enables stations to know ahead of time when they are to communicate, with which other stations they are to communicate and the antenna configuration that should be used. This frame also informs SISO-only stations of forthcoming MIMO transmissions activities on the medium so that the SISO-only stations respect the MIMO transmissions even though they do not understand those transmissions.

In accordance with one preferred embodiment of the invention, a method of implementing a wireless network having a plurality of wireless stations comprises first forming an aggregation frame to include a plurality of data unit fields and corresponding length fields. The data unit fields are used to hold data units and the length fields are used to hold values indicating the length of corresponding data unit fields. Then the aggregation frame is transmitted to a receiving station for decoding and recovering the aggregated data units.

In accordance with another preferred embodiment, a method of implementing a wireless network having a plurality of wireless stations comprises forming an allocation frame to specify a plurality of time intervals. For each time interval, the allocation frame identifies a pair of stations to communicate during the time interval and a configuration for the antenna communications between the identified pair of stations. This frame is broadcast to the network for decoding by the receiving stations in the network.

If desired, a buffered traffic field can be added to an aggregation frame, an allocation frame or other types of frame. The buffered traffic field specifies the amount of data units associated with the same traffic stream remaining to be transmitted following the transmission of the current frame. This field permits network traffic to be scheduled more effectively.

Also, a forward frame can be provided which communicates data between wireless stations. The forward frame preferably includes less header information than conventional data frames. Specifically, the forward frame includes a direction traffic stream and association identifier (DTAID) field which replaces four address fields. The forward frame's DTAID field can be used to obtain the needed MAC addresses from previously transmitted management frames.

These and other aspects and benefits of the preferred embodiments of the present invention will become apparent upon analyzing the drawings, detailed description and claims, which follow.

BRIEF DESCRIPTION OF THE DRAWINGS

For a detailed description of the preferred embodiments of the invention, reference will now be made to the accompanying drawings in which:

FIG. 10 is a more detailed example of the use of an allocation frame;

NOTATION AND NOMENCLATURE

Certain terms are used throughout the following description and claims to refer to particular system components. As one skilled in the art will appreciate, semiconductor companies may refer to a component and sub-components by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either a direct or indirect electrical or wireless connection. Thus, if a first device couples to a second device, that connection may be through a direct electrical connection, or through an indirect electrical or wireless connection via other devices and connections. The term "frame" refers to a basic communication structure which includes overhead information and data information. The term "data unit" simply refers to a segment of data comprising one or more bits. In the context of the 802.11 standard, a data unit is a MAC service data unit, but the term "data unit" is broader than just 802.11 wireless networks. To the extent that any term is not specially defined in this specification, the intent is that the term is to be given its plain and ordinary meaning.

DETAILED DESCRIPTION OF THE PREFERRED EMBODIMENTS

Figure 1:
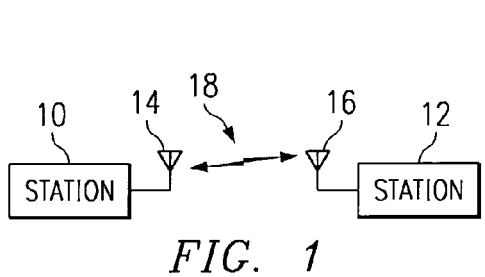
FIG. 1 shows two wireless devices communicating with each other using a single input, single output (SISO) antenna configuration.
Figure 3:
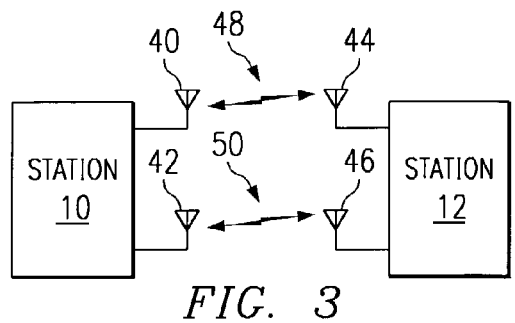
FIG. 3 shows the wireless devices of FIG. 1 communicating with each other using a multiple input, multiple output (MIMO) antenna configuration.
Figure 2:
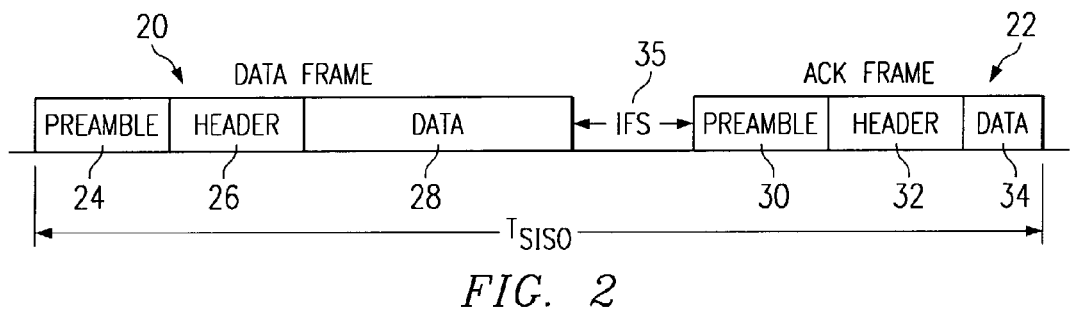
FIG. 2 shows a timing sequence associated with the SISO configuration.
Figure 4A:
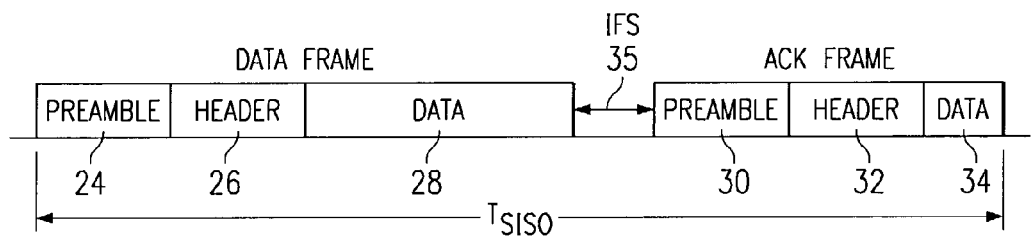
FIGS. 4a-4c show timing sequences associated with the SISO and MIMO antenna configurations of FIGS. 1 and 3.
Figure 4B:
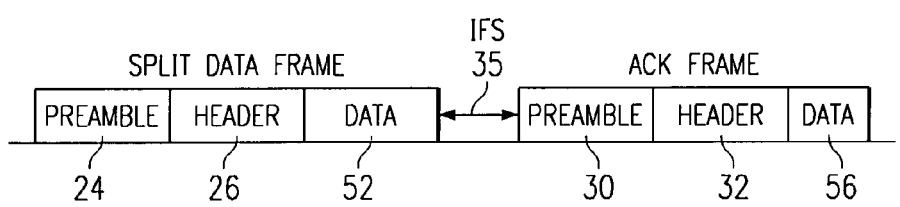
Figure 4C:
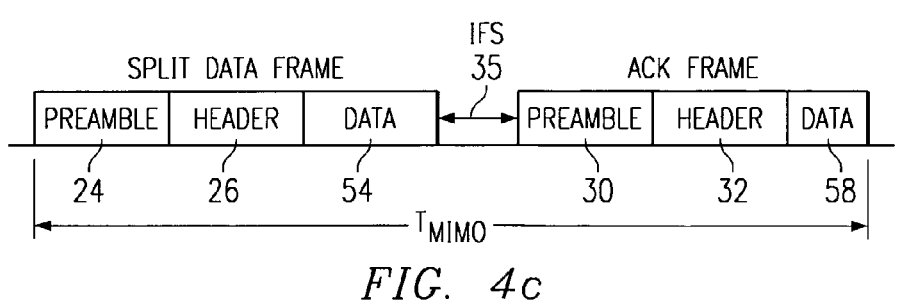
Figure 5:
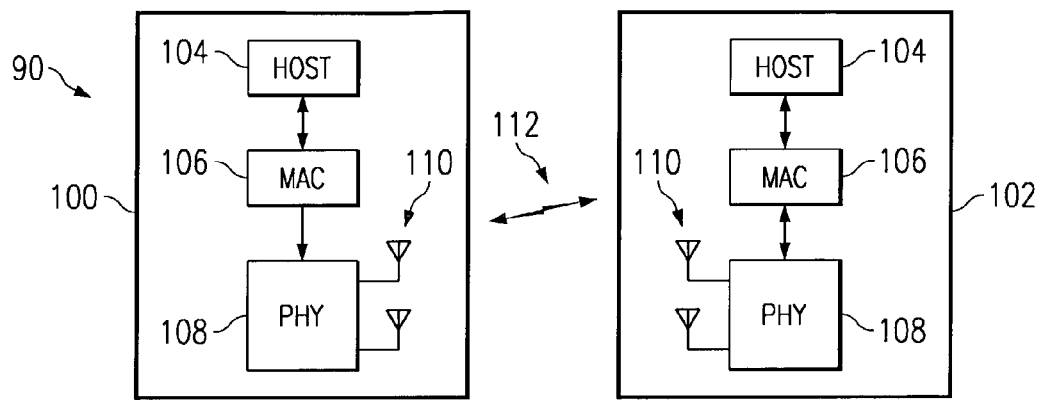
FIG. 5 shows a system diagram of a pair of wireless stations.

The preferred embodiments of the present invention will be described below in the context of the 802.11 family of wireless standards. The 802.11 standard is formally known as the "ISO/IEC 8802-11 International Standard (ANSI/IEEE Std 802.11)" referred to herein as the "802.11 standard" for sake of convenience and incorporated herein by reference. It provides wireless medium access control (MAC) and physical layer (PHY) specifications. The 802.11e/D2.0a draft standard defines, on the basis of the 802.11 standard, Medium Access Control (MAC) enhancements for quality of service (QoS). Referring to FIG. 5, a pair of wireless devices (also called "stations") 100 and 102 are shown comprising a wireless network 90. Although only two stations are shown in wireless network 90, in general the network can include more than two stations. Each station 100, 102 comprises host logic 104 (e.g., notebook computer, handheld computer, PDA, etc.) which communicates with another station via a wireless medium 112 using a MAC sublayer 106 and a PITY layer 108. The MAC sublayer 106 provides a variety of functions and services to facilitate effective wireless communications between stations. Examples of such services include data frame transmission and reception, security, and others. The host 104 uses these services to effectuate communications across the wireless medium 112. The PHY layer 108 provides an interface between the MAC layer 106 and the wireless medium and, as such, couples to one or more antennas 110. MAC and PHY layers are well known in the art and are described in greater detail in the 802.11 standard.

The currently adopted 802.11 standard defines a structure for various frame types such as control frames, data frames, and management frames. The discussion which follows describes the use of the basic 802.11 frame structure to implement various frame type enhancements to address the problems noted previously. Implementing such features in 802.11-compliant devices requires several variations from the currently adopted standard. These variations have been implemented in the following discussion and associated figures. It should be understood, however, that the scope of this disclosure and the claims that follow need not be limited to the 802.11 context.

In the context of 802.11, however, data frames are also referred to as MAC protocol data units (MPDUs). An MPDU generally comprises a MAC header, a data portion, and a frame check sequence (FCS) field. The PHY layer may add on a PHY preamble and a PHY header as described above. The data field contains a MAC service data unit (MSDU) or a fragment thereof Based on network activity, a station's MAC 106 may be programmed to fragment MSDUs in excess of a given length. Each fragment is transmitted in a separate frame with its own MAC header and FCS information as well as its own PHY header and preamble.

In some instances, it may be desirable not to send fragmented data in separate frames because of rapidly changing network conditions. That is, while network conditions may have been such that fragmentation made the most sense at the time, the conditions may have changed. However, fragments that have already been transmitted and need to be retransmitted due to transmission failures must proceed on with being sent in separate frames —the current 802.11 standard does not permit otherwise. Further, some MSDUs may be of a length less than the maximum permissible size of an MSDU in a MPDU. However, the current 802.11 standard requires such MSDUs to be placed into separate MPDUs.

In accordance with a preferred embodiment of the invention, the 802.11 standard can be extended so as to provide for a new type of frame called an "aggregation" frame (although the name of the frame type is not significant). An aggregation frame permits multiple MSDUs and/or multiple fragments of the same or different MSDUs to be placed into a single 802.11 MAC frame. This advantageously increases the amount of data being transmitted relative to the associated overhead and preamble information.

Figure 6:
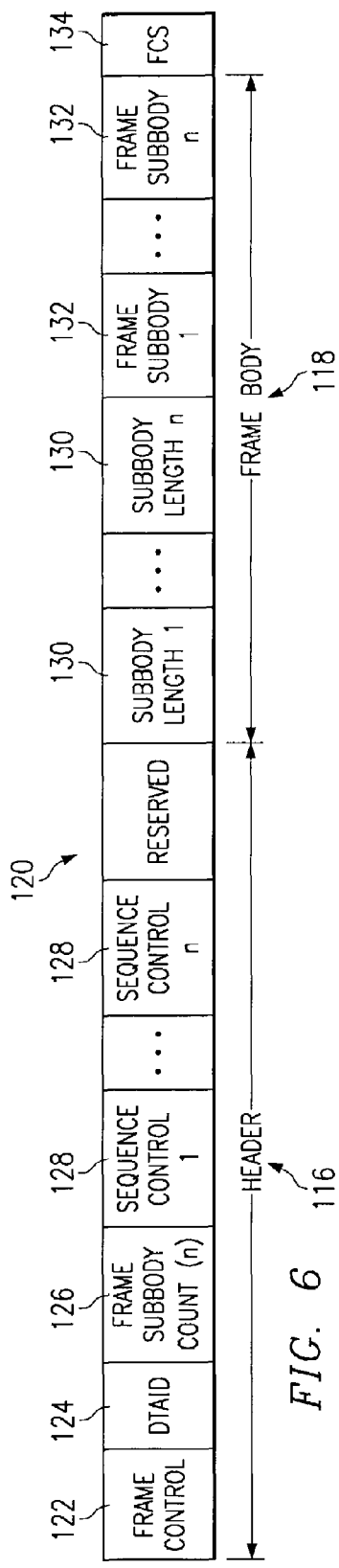
FIG. 6 shows a preferred embodiment of an aggregation frame usable to aggregate multiple data fields and/or fragments of data fields into a single frame to thereby increase the amount of data being transmitted relative to the amount of overhead information.

An exemplary embodiment of an aggregation frame is shown in FIG. 6. As shown, aggregation frame 120 comports with conventional 802.11 frame protocol in that it contains a MAC header 116, a frame body 118 and a frame check sequence (FCS) 134. The FCS 134 enables error detection and is implemented in accordance with conventional 802.11 protocol. The MAC header 116 and frame body 118 include information pertinent to aggregating MSDUs or fragments thereof. Some of this information is relevant to specifying that the frame is an aggregation frame and other information is relevant to specifying how the data is aggregated in the frame body 118. The header 116 preferably includes a frame control field 122, a DTAID field 124 (described in detail regarding FIG. 12), a frame subbody count field 126, and a sequence control field 128. The frame body 118 preferably includes one or more subbody length fields 130 and one or more frame subbody fields 132. In general, each subbody field 132 contains an MSDU or a fragment of an MSDU. By inclusion of MSDUs or fragments in the subbody fields 132, MSDUs and fragments can be combined together into a single frame for transfer between peer MAC entities.

In accordance with the 802.11 standard, the frame control field 122 is a 16 bit field. The frame control field 122 of the aggregation frame 120 preferably comprises the bit assignments shown below in Table I.

TABLE 1

Frame Control of Aggregation Frame

| Bit(s) | Value | Designation | Description |
|---|---|---|---|
| 0-1 | 00 | Protocol Version | Specifies the current 802.11 std |
| 2-3 | 11 | Type | Specifies the type of frame |
| 4-7 | 1000 | Sub-type | Specifies aggregation frame |
| 8 | | To DS | Specifies whether the frame is destined for the distribution system (DS) |
| 9 | | From DS | Specifies whether the frame came from the distribution system (DS) |
| 10 | | More Fragment | Specifies whether there are more fragments that belong to the same MSDU as the data contained in the last frame subbody field of the Aggregation frame |
| 11 | | Ack | Acknowledgment request |
| 12 | | Power Management | Specifies power management mode |
| 13 | | More Data | Specifies whether more MSDUs are buffered for the addressed station at an access point (AP) after the transmission of this frame |

TABLE 1-continued

Frame Control of Aggregation Frame

| Bit(s) | Value | Designation | Description |
| --- | --- | --- | --- |
| 14 | | Wired Equivalent Privacy (WEP) | Indicates whether the frame body contains information that has been processed by the WEP algorithm |
| 15 | | Forward error correction (FEC) | Enables forward error correction |

Bits 8-9 and 12-15 are set in accordance with currently adopted 802.11 standard. The frame type identified by bits 2 and 3 specify a frame type that previously had been reserved. The aggregation frame described herein does not fall within any of the currently specified types, so a new type has been defined. The sub-type field in bits 4-7 are set to a value of "1000" so as to indicate that the frame type specifically is an aggregation frame. The sub-type value of "1000" can be varied as desired. The More Fragment bit 10 preferably is set to a value of 0 to indicate that the frame contains the sole or final fragment of an MSDU in the last frame subbody field and to 1 to indicate that the frame contains a non-final fragment of an MSDU in the last frame subbody field. Acknowledgment bit 10 preferably specifies whether or not the aggregation frame is to be acknowledged (at the MAC level). The frame control field 122 thus generally specifies that the frame comprises an aggregation frame and other control information.

Referring still to FIG. 6, the DTAID field 124 preferably specifies the traffic stream to which the data contained in the frame subbodies belongs. The MAC sublayer 106 can accommodate uniquely identifiable multiple traffic streams between pairs of stations. The frame subbody count field 126 indicates the number of frame subbodies 132 contained in the frame 120. Each subbody 132 has an associated sequence control field 128 and a subbody length field 130. The sequence control fields 128 contain sequence control values for each of the frame subbodies 132. The sequence control values include the sequence number of the MSDU in a corresponding frame subbody field 132. For example, sequence control field 1 contains sequence control information associated with frame subbody 1. In accordance with conventional 802.11 protocol, each MSDU is assigned a unique sequence number to enable a receiving station to process the MSDUs in the order in which they were transmitted. The sequence control field 128 may also include a fragment number. All fragments comprising an MSDU are assigned the same sequence number but incremental fragment numbers. Thus, if the corresponding frame subbody field 132 contains a fragment of an MSDU, rather than a complete MSDU, the fragment number in the sequence control field 128 includes the correct fragment number. If the corresponding subbody field 132 contains an entire MSDU, the fragment number preferably is set to 0.

In addition to a sequence control field 128, each frame subbody 132 preferably also has associated with it a subbody length field 130. Each subbody length field specifies the length of the associated MSDU, or fragment thereof, contained in the corresponding subbody 132. The length preferably is specified in units of "octets" (8 bits), but other length units can be used as well.

The aggregation frame 120 includes at least two subbody fields 132. As explained above, each subbody field 132 contains an MSDU, or a fragment thereof, that corresponds to the traffic stream specified by the DTAID field 124, plus, as would be understood by those skilled in the art, appropriate encryption overheads (such as ICV and IV) when the WEP bit is set in the frame control field 122. Preferably, but not a requirement, each subbody field 132 is zero padded by one octet if the corresponding subbody length field 130 is an odd value so that successive frame subbodies begin on even octet boundaries. Other features can be implemented if desired. For example, frame subbodies in a given aggregation frame 120 may be either not encrypted at all or encrypted separately but using the same encryption method or algorithm. Further, frame subbodies in a given aggregation frame may either be not FEC encoded at all or FEC encoded separately but using the same code.

Figure 7:
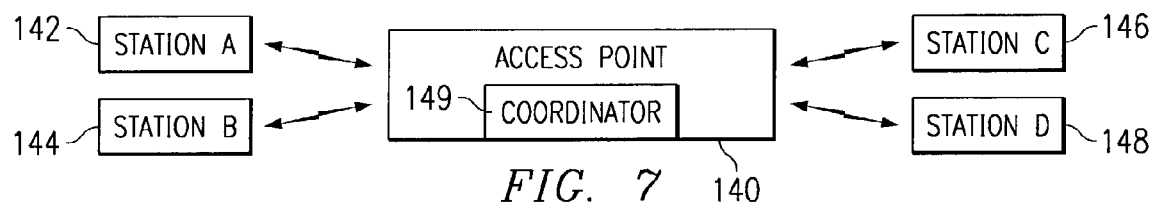
FIG. 7 shows an exemplary wireless network comprising a plurality of stations and an access point.

In accordance with another preferred embodiment of the invention, a MAC frame is encoded so as to allocate time intervals in which pairs of stations can communicate with each other according to a specified antenna configuration. This type of frame is called an "allocation" frame (again, the name designation for the frame itself is not intended to impart any limitations). The allocation frame advantageously enables network stations to know ahead of time what antenna configuration they are to use. Referring to FIG. 7 for context, a wireless network comprises a plurality of stations 142-148, designated in FIG. 7 as Station A-Station D, respectively. The network also includes an access point (AP) 140 which provides connectivity to a wire- or/and wireline-linked distribution system. The AP 140 further contains a "coordinator" 149 which preferably performs bandwidth management and scheduling on the wireless medium. The coordinator 149 may be a so-called "hybrid" coordinator currently being proposed for the 802.11e/D2.0a draft standard.

Figure 8:
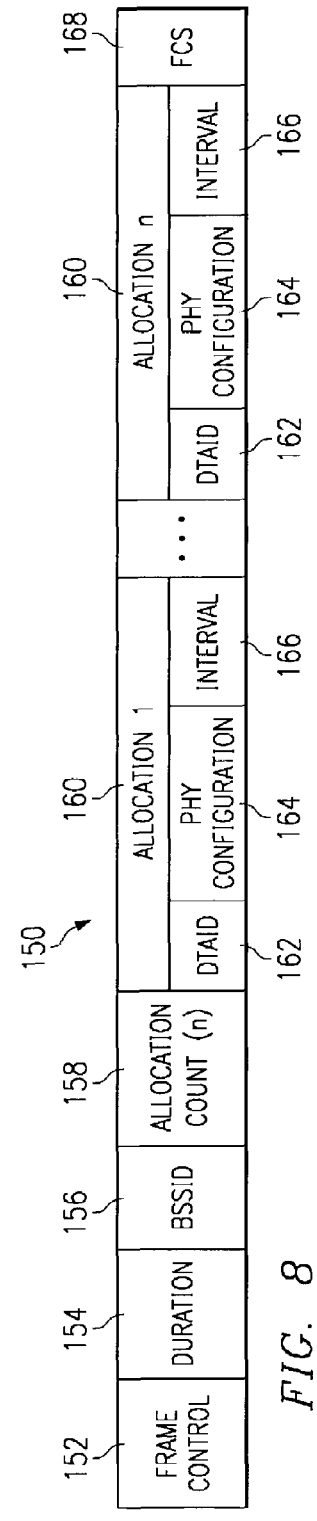
FIG. 8 shows an exemplary preferred embodiment of an allocation frame usable to permit stations to know what PHY configuration to use when communicating on the network FIG. 9 conceptually illustrates the use of the allocation frame.

One of the functions performed by the coordinator 149 is to generate and transmit allocation frames to the various stations 142-148. An exemplary embodiment of an allocation frame is shown in FIG. 8 and discussed below. The allocation frame is transmitted by the coordinator 149 to the stations preferably using a SISO antenna configuration so that all stations, even those stations that are not MIMO capable, in the network can correctly receive the allocation frame.

Referring now to FIG. 8, a preferred embodiment of an allocation frame 150 is shown comprising a frame control field 152, a duration field 154, a BSSID field 156, an allocation count field 158, one or more allocation fields 160 and an FCS field 168. As explained previously, an 802.11 frame control field 152 includes bits for a type and a subtype. To specify an allocation frame, the type bits 2 and 3 preferably are set to values of 1 and 0, respectively, to specify a "control" frame type. In the current version of the 802.11 standard, a control subtype field of 0010 is reserved. In accordance with the preferred embodiment of the invention, however, this subtype value (0010) is used to signify an allocation frame subtype.

The duration field 154 preferably is used to encode the duration in, for example, microseconds, of all of the time intervals specified in the allocation frame. All the stations in the network decode this field and refrain from transmissions within the duration indicated by this field, unless they are specified to be a transmitting station via the DTAID subfield 162 of one of the allocation fields 160 (to be further described below). The BSSID 156 preferably is the MAC address of the AP 140 containing the active coordinator 149. All the stations in the basic service set (BSS) containing this AP recognize this address and process the allocation frame. Further, the allocation count 158 specifies the number of time intervals defined by the allocation frame.

Figure 9:
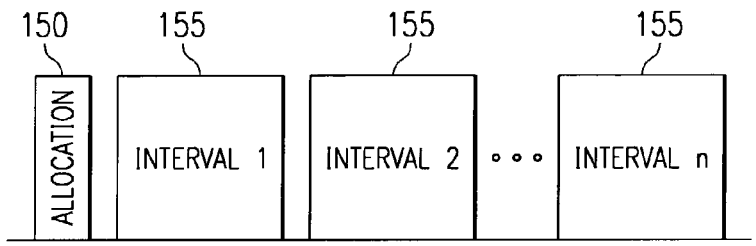

Each allocation frame 150 specifies one or more allocation time intervals. In each interval, a pair of stations are permitted to communicate with each other using an antenna configuration specified for that particular interval. This concept is illustrated in FIG. 9 in which an allocation frame 150 is shown followed by a series of n time intervals 155 (interval 1-interval n). The allocation frame 150 defines the number of time intervals 155 (e.g., n) and other specific configuration features of the communications between stations that are to be allowed during each of the time intervals. The duration field 154 preferably is set to the sum of all of the intervals 155 allocated by the allocation frame. All stations, including legacy SISO-only stations, receive the allocation frame and set their NAV (network allocation vector) to the received duration value so that they will not transmit within that duration unless otherwise specified to transmit within the duration by the allocation vector. The NAV is a virtual carrier sense mechanism, as opposed to an actual carrier sense mechanism and is also specified by the 802.11 standard. This prevents stations that do not physically sense an actually busy medium to be busy from transmitting during the intended transmission period.

Referring again to FIG. 8, the allocation fields 160 following the allocation count field 158 include information regarding the specifics of each allocation time interval. Each allocation field 160 preferably includes three fields of information, namely, a DTAID subfield 162, a PHY configuration subfield 164 and a time interval subfield 166. Each time interval allocates resources for a transmitting station to transmit data to a receiving station. The DTAID subfield 162 specifies indirectly the address of the transmitter and the address of the receiver, as the DTAID was linked to those addresses through previously communicated management frames according to the 802.11e/D2.0a draft standard. The PHY configuration subfield 164 preferably specifies the configuration to be used for the transmission and reception within the corresponding interval. More specifically, the PHY configuration 164 may identify the PHY rate (which, in turn, identifies the modulation and coding schemes) and transmit/receive antenna type (as used for beamswitching, beamsteering, beamforming, transmit diversity, receive diversity, spatial multiplexing, etc.). The time interval subfield 166 preferably specifies a time limit for transmission from the transmitter station to the receiver station as identified in the DTAID subfield 162. The time limit may be provided in any suitable units such as microseconds.

Referring now to FIG. 10, a series of intervals 172 are shown following an allocation frame 150. In accordance with a preferred embodiment of the allocation frame feature, the first frame 174 in an interval preferably begins at a time T from the end of the allocation frame that allocated that interval, where T equals "aSIFSTime" or simply "SIFS" (known to those of ordinary skill in the art and define in the 802.11a standard as 16 microseconds) plus the sum of all preceding intervals allocated by the same allocation frame. The first frame 174 in each time interval preferably has a full PHY preamble. Each successive frame 176 within the same interval starts at preferably aSlotTime from the end of the preceding. The 802.11a standard specifies aSlotTime to be 9 microseconds. Each such successive frame 176 preferably has a short PHY preamble as defined in the 802.11 standard.

Once the coordinator 149 broadcasts the allocation frame 150 to the stations in the BSS, the receiving stations decode the allocation frame to determine when they are to transmit and/or receive. In this manner, each station will know ahead of time what antenna configuration (e.g., SISO, 2×2 MIMO, etc.) to use and when. The stations permitted to communicate in any given interval can be whatever stations are desired. Each interval can be set up for a unique pair of stations or, alternatively, more than one time interval defined in an allocation frame can be used for the same pair of stations. Following the end of all of the time intervals defined by the allocation frame, the coordinator 149 may issue another allocation frame 150 thereby defining another set of time intervals.

Figure 11:
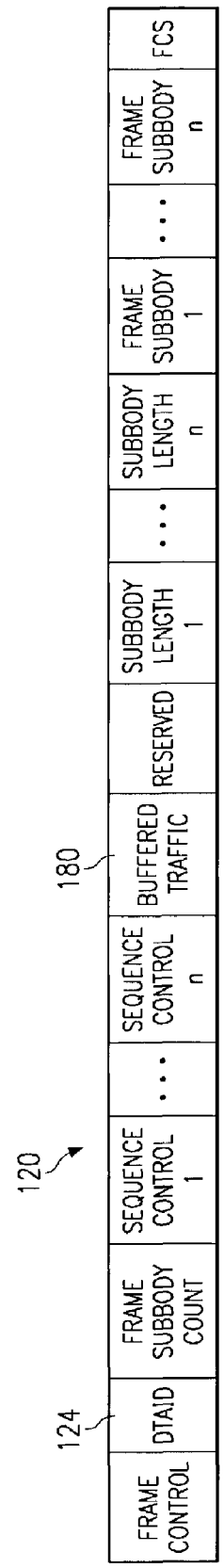
FIG. 11 shows an aggregation frame including a buffered traffic field to permit a network coordinator to more efficiently schedule network traffic.

FIG. 11 shows another preferred embodiment of the invention. The frame shown in FIG. 11 is an aggregation frame 120, as described previously. All of the fields shown in the frame 120 in FIG. 11 are the same as that described above with the exception of the "buffered traffic" field 180. This field can be inserted into other frame types besides the allocation frame. The buffered traffic field 180 preferably specifies or otherwise indicates to a coordinator, such as coordinator 149 in FIG. 7, how much data associated with the traffic stream specified by the DTAID field 124 remains after the current frame or how much time is needed in sending that remaining data. Such remaining data is buffered at the transmitting station and is awaiting transmission over the wireless network. This information is useful for scheduling subsequent communications across the wireless network.

The buffered traffic field 180 preferably comprises a 16-bit field. Bit 15 is used to encode a "Unit" subfield and bits 14-0 are used to encode a traffic stream state. In accordance with a preferred embodiment of the invention, if the Unit subfield is set to a 0, the traffic stream state in bits 14-0 indicates a time amount, preferably in units of 8 microseconds, needed for transmitting the buffered data present at the transmitting station belonging to the traffic stream specified by the DTAID field 124. Alternatively, when the Unit subfield is set to a 1, the traffic stream state in bits 14-0 indicate the remaining traffic amount in units of, for example, 64 octets.

In accordance with another preferred embodiment of the invention resulting in increased efficiency in a wireless network, the 802.11 MAC standard can be extended to provide for a "forward" frame. A forward frame is generally a shortened version of a standard MAC data frame. A standard 802.11 data frame includes four address fields requiring 6 octets each, 24 octets total. The addresses in these fields depends on the types of data frame. For example, the four address fields may include a receiver address, a transmitter address, a destination address, and a source address. A forward frame eliminates the need for that much address information.

Figure 12:
FIG. 12 shows a preferred embodiment of a forward frame.

Referring now to FIG. 12, an exemplary embodiment of a forward frame 200 is shown comprising a frame control field 202, a DTAID field 204, a sequence control field 206, a frame body 208 and a FCS field 210. The frame control field 202 identifies the frame as a forward frame by the way its type and subtype subfields are encoded (11 and 0000, respectively). The sequence control, frame body and FCS fields are encoded as described previously.

In accordance with the preferred embodiment, a two octet DTAID field 204 replaces the 24 octet address fields of conventional 802.11 data frames. The DTAID field includes a direction (D) bit concatenated to a TAID field. The TAID field includes a traffic stream identifier (TID) and an association identifier, as defined in the 802.11e/D2.0a draft standard. Preferably, a previously transmitted management frame also includes a matching TAID field. Such a management frame also includes a source address and a destination address associated with the TAID information. One or more of the network stations receive the management frame and store the source and destination addresses and associated TAID information. With that routing information disseminated throughout the network, each subsequent data frame does not necessarily need all four address fields. Any needed MAC addresses can be looked up from such previously transmitted management frames. The direction bit may be encoded as a "0" to indicate a frame from a coordinator to a station or a "1" to indicate a frame from a station to the coordinator or another station.

Figure 13:
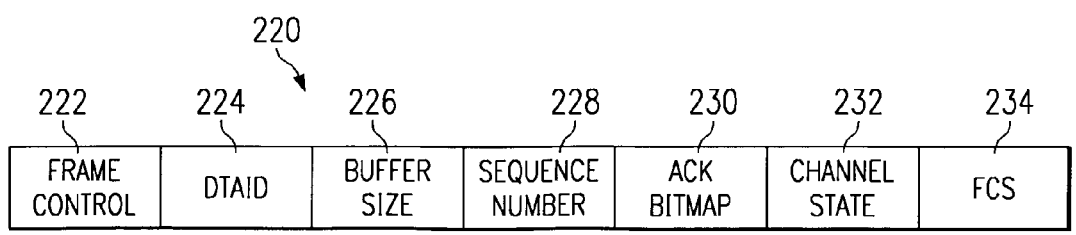
FIG. 13 shows a preferred embodiment of a feedback frame.

FIG. 13 shows a preferred embodiment of a feedback frame 220. This frame includes a frame control 222, DTAID 224, buffer size 226, sequence number 228, acknowledgment (ACK) bitmap 230, channel state 232 and FCS 234. The frame control 222, DTAID 224, sequence number 228 and FCS 234 are as described above with the type and subtype fields in the frame control encoded to specify a feedback frame. The buffer size and ACK bitmap fields 226, 230 are used for group frame transmissions and corresponding group acknowledgments and are described in detail in copending application entitled "A Method and System for Group Transmission and Acknowledgment," incorporated herein by reference. In short, the feedback frame may provide acknowledgment information for a group of previously transmitted frames. The channel state field 232 indicates channel state information (CSI). CSI generally includes information on the channel used in transmitting the data on the traffic stream specified by the DTAID. Accordingly, the feedback frame provides both group acknowledgment and channel state information.

The aforementioned features describe various enhancements to current wireless MAC protocols to accommodate new PHY setups, including new antenna configurations, to increase channel utilization, and hence to improve user throughput. The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A process of wireless data transmission comprising:
   A. forming a medium access control aggregation frame that includes a medium access control header, a frame body, and a frame check sequence, the forming including:
      i. arranging in the header a frame control field, a DTAID field, a frame subbody count field, and sequence control fields; and
      ii. arranging in the frame body subbody length fields and frame subbody fields by arranging one frame subbody field for a sequence control field and a subbody length field, each of the frame subbody fields being arranged to contain one of a service data unit and a fragment of a service data unit; and
   B. transmitting the aggregation frame through a physical layer and an antenna.

2. The process of claim 1 in which the forming includes placing multiple service data units in a single aggregation frame.

3. The process of claim 1 in which the forming includes placing multiple fragments of the same service data unit in a single aggregation frame.

4. The process of claim 1 in which the forming includes placing multiple fragments of different service data units in a single aggregation frame.

5. The process of claim 1 in which the forming includes forming an extension of an IEEE 802.11 standard.

6. The process of claim 1 including communicating between host logic circuitry of different wireless devices with the aggregation frame.

7. The process of claim 1 including transmitting the aggregation frame as a medium access control protocol data unit.

8. A wireless device comprising:
   A. host logic;
   B. medium access control circuitry coupled to the host logic, the medium access control circuitry providing an aggregation frame that includes a medium access control header, a frame body, and a frame check sequence, the header including a frame control field, a DTAID field, a frame subbody count field, and sequence control fields, and the frame body including subbody length fields and frame subbody fields, there being one sequence control field and one subbody length field for each frame subbody field, each of the frame subbody fields being arranged to contain one of a service data unit and a fragment of a service data unit;
   C. an antenna coupled to the physical layer; and
   D. a physical layer coupled to the medium access control circuitry to apply the aggregation frame to the antenna.

9. The wireless device of claim 8 in which the frame subbody fields contain multiple service data units in a single aggregation frame.

10. The wireless device of claim 8 in which the frame subbody fields contain multiple fragments of the same service data unit in a single aggregation frame.

11. The wireless device of claim 8 in which the frame subbody fields contain multiple fragments of different service data units in a single aggregation frame.

12. The wireless device of claim 8 in which the medium access control circuitry operates as an extension of an IEEE 802.11 standard.

13. The wireless device of claim 8 in which an antenna of a different wireless device receives the aggregation frame from the antenna.

14. The wireless device of claim 8 in which the aggregation frame is a medium access control protocol data unit.

* * * * *

UNITED STATES PATENT AND TRADEMARK OFFICE
CERTIFICATE OF CORRECTION

PATENT NO.        : 7,630,403 B2                                              Page 1 of 1
APPLICATION NO. : 10/188188
DATED             : December 8, 2009
INVENTOR(S)       : Ho et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2103 days.

Signed and Sealed this

Second Day of November, 2010

David J. Kappos
*Director of the United States Patent and Trademark Office*